United States Patent

[11] 3,607,289

| [72] | Inventors | Wolfgang Keberle,<br>Wolfgang Himmelmann; Fritz Nittel;<br>Gunter Oertel, all of Leverkusen, Germany |
|---|---|---|
| [21] | Appl. No. | 662,582 |
| [22] | Filed | Aug. 23, 1967 |
| [45] | Patented | Sept. 21, 1971 |
| [73] | Assignee | Agfa-Gevaert Aktiengesellschaft<br>Leverkusen, Germany |

[54] GELATIN EMULSIONS HAVING IMPROVED PROPERTIES
2 Claims, No Drawings

[52] U.S. Cl. .................................................. 96/114,
 96/114.4, 106/136
[51] Int. Cl. .................................................. G03c 1/04
[50] Field of Search ........................................... 96/114.4,
 114, 111; 106/136

[56] References Cited
UNITED STATES PATENTS

| 3,258,338 | 6/1966 | Claeys et al. .................. | 96/114.4 X |
| 3,397,989 | 8/1968 | Keberle et al. ................. | 96/114 |

*Primary Examiner*—Ronald H. Smith
*Attorneys*—Walter G. Hensel, Walter C. Kehm and Samson B. Leavitt

ABSTRACT: Photosensitive photographic material having at least one gelatin-containing emulsion comprising an anionic polyurethane in which the salt-forming groups are phosponic acid, phosphoric ester or phosphoric acid amide groups, or their salts.

GELATIN EMULSIONS HAVING IMPROVED PROPERTIES

This invention relates to light-sensitive photographic material having at least one gelatin-containing photographic emulsion which includes a plasticizing amount of an anionic polyurethane.

It was found that, in order to improve the mechanical properties of gelatin emulsions, there can advantageously be employed anionic polyurethanes which contain as groups capable of salt-formation, at least one phosphonic acid group, phosphoric acid ester group or phosphoric acid amide groups, or salts thereof.

The polyurethanes to be used in accordance with the invention are polyadducts prepared by the isocyanate polyaddition method and which are obtained from compounds having a plurality of reactive hydrogen atoms with a molecular weight of 300–10,000, polyisocyanates and possibly chain-lengthening agents having reactive hydrogen atoms.

Upon the production of these polyurethanes or subsequent thereto, isocyanate groups still present in them are reacted with a compound having at least one active hydrogen atom and at least one phosphonic acid, phosphoric acid orphosphoric acid amide group or alkali salts thereof. When the acid compounds are used, the resultant polyurethane mass is thereupon converted in known manner, at least in part, into salt form.

By the expression phosphonic acid, phosphoric acid ester and phosphoric acid amide groups, there are to be understood the following groupings respectively:

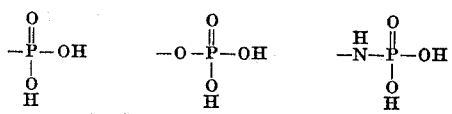

the free bonds being connected with the polyurethanes.

These groupings may also contain additional ester or amide groupings:

In order to obtain a good compatibility with gelatin, the proportion by weight of the phosphonic acid or phosphoric acid groups is more than 0.5 percent and at most 15 percent, — preferably 1.0—5 percent. The concentration of the anionic polyurethanes in the photographic gelatin layers can vary from 0.05 to 1 percent of the weight of gelatin.

The following compounds are suitable as starting materials for the manufacture of the anionic polyurethanes:

COMPOUNDS WITH ACTIVE HYDROGEN ATOMS

These compounds are essentially linear and have a molecular weight of about 300—10,000 and preferably 500–4,000. These known compounds have terminal hydroxyl, carboxyl and amino groups; polyhydroxyl compounds such as polyesters, polyacetals, polyethers, polyamides and polyester amides are preferred. The hydroxyl number of these compounds is preferably about 40–70 and especially 50–60.

As polyethers there may be mentioned, for instance, the polymerization products of ethylene oxide, propylene oxide, tetrahydrofuran and butylene oxide, as well as their copolymerization or graft-polymerization products, and also the condensates obtained by condensation of polyhydric alcohols or mixtures thereof, and the products obtained by alkoxylation of polyhydric alcohols.

As polyacetals there enter into consideration, for instance, the compounds which can be prepared from hexane diol and formaldehyde.

As polyesters, polyester amides and polyamides there can be used the predominantly linear condensates obtained from polyvalent saturated carboxylic acids and polyhydric saturated alcohols, amino alcohols, diamines and their mixtures.

Polyhydroxyl compounds which already contain urethane or urea groups, and perhaps modified natural polyols, such as castor oil or carbohydrates, can be employed.

Of course, mixtures of different polyhydroxyl compounds can be used in order to vary the lyophilic or hydrophobic nature and mechanical properties of the products of the process.

POLYISOCYANATES

As polyisocyanates there are suitable all aromatic and aliphatic diisocyanates, such as 1,5-naphthylene-diisocyanate, 4,4'-diphenylmethane-diisocyanate, 4,4'-diphenyl-dimethylmethane-diisocyanate, di-and tetraalkyl-diphenylmethane-diisocyanate, 4,4'dihenzyl-diisocyanate, 1,3-phenylene-diisocyanate, 1,4-phenylene-diisocyanate, the isomers of toluylene diisocyanate, and mixtures thereof, chlorinated and brominated diisocyanates—preferably the aliphatic diisocyantes—butane-1,4-diisocyanate, hexane-1,6-diisocyanate, dicyclohexyl methane diisocyanate and cyclohexane-1,4-diisocyanate.

CHAIN-LENGTHENING AGENTS

The chain-lengthening agents having reactive hydrogen atoms include:

1. The customary glycols such as ethylene glycol or condensates of ethylene glycol, butanediol, propanediol-1,2, propanediol-1,3, neopentylglycol, hexanediol, bishydroxymethyl-cyclohexane and dioxethyl-diane;
2. The aliphatic, cycloaliphatic and aromatic diamines such as ethylenediamine, hexamethylenediamine, 1,4-cyclohexylenediamine, benzidine, diaminodiphenyl-methane, the isomers of phenylenediamine, hydrazine and ammonia;
3. Aminoalcohols such as ethanolamine, propanolamine, butanolamine;
4. Polyfunctional amines or hydroxyl compounds such as diethylenetriamine, glycerine, the monohydrozy alkylated polyamines such as, for instance, N-hydroxyethylethylenediamine and N-hydroxyethyl-hexamethylenediamine;
5. Water.

COMPOUNDS CAPABLE OF SALT-FORMATION

Aminopropane-phosphonic acid, aminopropane-phosphonic acid-monoethyl ester and monomethyl ester, colamine-phosphoric acid, aminomethane-phosphonic acid, 4-aminobenzene-phosphonic acid, 2-aminobenzene-phosphonic acid, 4-aminophenylmethane-phosphonic acid, 3-aminomethylbenzene acid, 4-methyl-aminobenzene-phosphonic acid, 4-amino-2-hydroxybenzene-phosphonic acid, phosphoric acid-mono-(N-methyl-aminoethyl ester), phosphoric acid-bis-2-aminoethyl ester, phosphoric acid-bis-glycol ester, hydroxyethane-phosphonic acid, phosphoric acid-bis-propyleneglycol ester, N,N-(bis-3-amino-propyl)-aminomethane phosphonic acid, N,N-(bis-3-aminopropyl)-amido-phosphoric acid, N-methyl-N-3-aminopropyl-methane-phosphoric acid, 2-aminopropane-2-phosphonic acid monomethyl ester, N-3-aminopropylimino-bis-methane phosphonic acid, a-amino-4-methyl-phenyl-methane-phosphonic acid, 1-aminoethane-1, 1-diphosphonic acid, butylaminomethane phosphonic acid, 2-ethyl-aminopropane-2-phosphonic acid-monoethyl ester, phosphoric acid-2-hydroxyethylester-ethylester, N,N-(bis-β-hydroxyethyl)-aminomethane-phosphonic acid, phosphoric acid-methylester-2-hydroxy-propylester.

The above acid groups can be converted in customary manner to salt form by reaction with the compounds mentioned below:

Inorganic bases and compounds which have a basic reaction or splitoff bases, such as monovalent metal hydroxides, carbonates and oxides, e.g., sodium hydroxide, potassium hydroxide, sodium carbonate, potassium carbonate and sodium bicarbonate.

The quantity of polyisocyanate is preferably so selected that all groups which are reactive with isocyanate groups actually react.

The reaction may be carried out with the simultaneous use of solvents, in which connection low-boiling solvents, such as acetone, ethanol, methanol, tertiary butanol, methylethylketone are preferably used, which solvents may also contain a proportion of water. As solvents for inorganic bases and the compounds having at least one hydrogen atom reacting with isocyanate groups in at least one saltlike group or group capable of forming a salt, water can also be used without addition of organic solvents.

The resulting predominantly linear high molecular weight anionic polyurethanes collect, on addition of water, in the aqueous phase and the organic solvents are removed simultaneously or subsequently. There are obtained dispersions which may be in the form of pastes or solutions.

Suitable anionic polyurethanes are, for instance, the following polyaddition products:

COMPOUND 1

Polyaddition product from 210.5 grams adipic acid-1,6-hexanediol-neopentylglycol-polyester (molar ratio 30:22:12; OH number 66), 39.1 grams 1,6-hexanediisocyanate and 14.0 grams sodium-2-amino-propane-phosphonate-monomethyl ester; prepared as a 33 percent aqueous dispersion.

COMPOUND 2

Polyaddition product from 250.0 grams adipic acid-1,6-hexanediol-neopentylglycol-polyester (molar ratio 30:22:12; OH number 66), 49.0 grams 1,6-hexanediisocyanate and 28.0 grams sodium-2-aminopropane-phosphonate-monomethyl ester; prepared as a 33 percent aqueous dispersion.

The preparation of the anionic polyurethanes containing phosphonate and phosphate groups to be used in accordance with the invention is effected by first of all preparing a preadduct from the higher molecular weight compound containing reactive hydrogen atoms and having a molecular weight of 300–10,000 and the polyisocyanates at 70°–120° C. and preferably 80°–120° C. When using aromatic diisocyanates, a temperature of 70°–90° C. is generally sufficient; in the case of aliphatic diisocyanates, temperatures of 110°–130° C. are preferred. Low molecular weight chain-lengthening agents, which may be used simultaneously, can be added with the prepolymer at a temperature which corresponds to one of the above-indicated ranges. However, it is also possible to react the prepolymer with the chain-lengthening agents in organic solution. After completion of the prepolymer reaction, the preadduct having the isocyanate groups is dissolved in an organic low-boiling solvent, such as, for instance, acetone, and thereupon reacted at 30°–60° C. with the compound bearing phosphonate or phosphoric acid ester or amide groups. As solvents for these compounds, water, methanol, and ethanol, etc. are suitable. Finally, an amount of water sufficient to yield the desired solids content of the dispersion to be prepared is added to the reaction batch, and the organic solvent is distilled off in vacuum. The resultant anionic polyurethane-containing dispersion can be used directly for modifying gelatin.

EXAMPLE 1

To separate parts of a mixture of
1 liter of a photographic emulsion, which contains
35 grams silver bromide and 80 grams gelatin
there are added 30 percent (based on the weight of the gelatin) of compounds 1 and 2, respectively, in the form of a 33 percent aqueous dispersion, with strong agitation. Thereupon, 24 grams of 1-hydroxy-4-sulfo-2-naphthoic acid heptadecylamide is added as a color component in aqueous solution. The pH is brought to 6.2. After addition of the customary coating additives, such as hardening agents (30 cc. of 5 percent triacryloyl-hydrotriazine solution) and wetting agent (12 cc. of 10 percent saponin solution), the mixture is coated onto a prepared emulsion support of cellulose triacetate and dried at 22° C. The thickness of the emulsion is 20μ. The brittleness is measured by flexing to failure in a standard testing device after conditioning at 35 percent and at 50 percent relative humidity.

RESULTS

| Addition | | Number of Flexures | |
|---|---|---|---|
| | | Measurement at 35% relative humidity | At 50% relative humidity |
| 0% | | 10 | 35 |
| 30% | Compound 1 | 290 | 940 |
| 30% | Compound 2 | 250 | 810 |

By addition of compounds 1 and 2, there are obtained emulsions of substantially less fragility. The number of flexures represents a measure of the flexibility of the emulsions. The dry emulsions are completely clear despite the addition. The two compounds do not change the photographic properties of the emulsion, such as fog and speed.

EXAMPLE 2

To a silver halide-gelatin emulsion, which contains, per liter of coating solution, 90 grams of gelatin and 0.33 mols of silver bromide and 0.0075 mols of silver iodide, 30 percent each of compounds 1 and 2 in the form of aqueous dispersions are respectively added with strong agitation. After addition of the customary coating additives, such as hardening agents (for instance, 0.3 percent formalin) and wetting agents (for instance, saponin), the mixtures are poured onto baryta-coated paper in a layer thickness of 10μ and the paper is dried.

After exposure, the papers are developed in a developer having the following composition:
4 grams metol
1 gram hydroquinone
25 grams sodium sulfite (anhydrous)
35 grams soda (anhydrous)
1 gram potassium bromide water to 1 liter.

Thereupon, they are treated with an acid-fixing bath and washed for half an hour.

The papers are dried on a high-gloss drying press and thereupon immediately pulled over rollers of different diameter (60–10 mm.). As measured value, there is indicated the diameter in mm. at which the layers break. The flexibility of the layer and thus the softening action of a substance is better, the lower the value.

RESULTS

| Addition | Diameter of the Roller |
|---|---|
| 0% | 60 mm. |
| 30% Compound 1 | 15 mm. |
| 30% Compound 2 | 20 mm. |

The compounds have good plasticizing action. They do not affect the photographic properties, such as fog and speed. The speed of development is somewhat increased over the standard.

We claim:

1. Photographic light-sensitive silver halide material having at least one gelatin-containing emulsion containing an anionic polyurethane which is a polyaddition product of a compound having a molecular weight of 300–10,000 and a plurality of reactive hydrogen atoms, a polyisocyanate and a compound having at least one active hydrogen atom and at least one salt-forming group selected from the class consisting of phosphonic acid, phosphoric acid ester and phosphoric acid amide groups and their salts wherein the percentage by weight of the salt-forming groups in the anionic polyurethane is 0.5 to 15 percent of the total weight of the polyurethane and the amount of said anionic polyurethane is 0.05 to 1 percent of the weight of the gelatin.

2. Photographic material according to claim 1, wherein said compound having molecular weight of 300–10,000 is a polyester which contains hydroxyl groups.